UNITED STATES PATENT OFFICE.

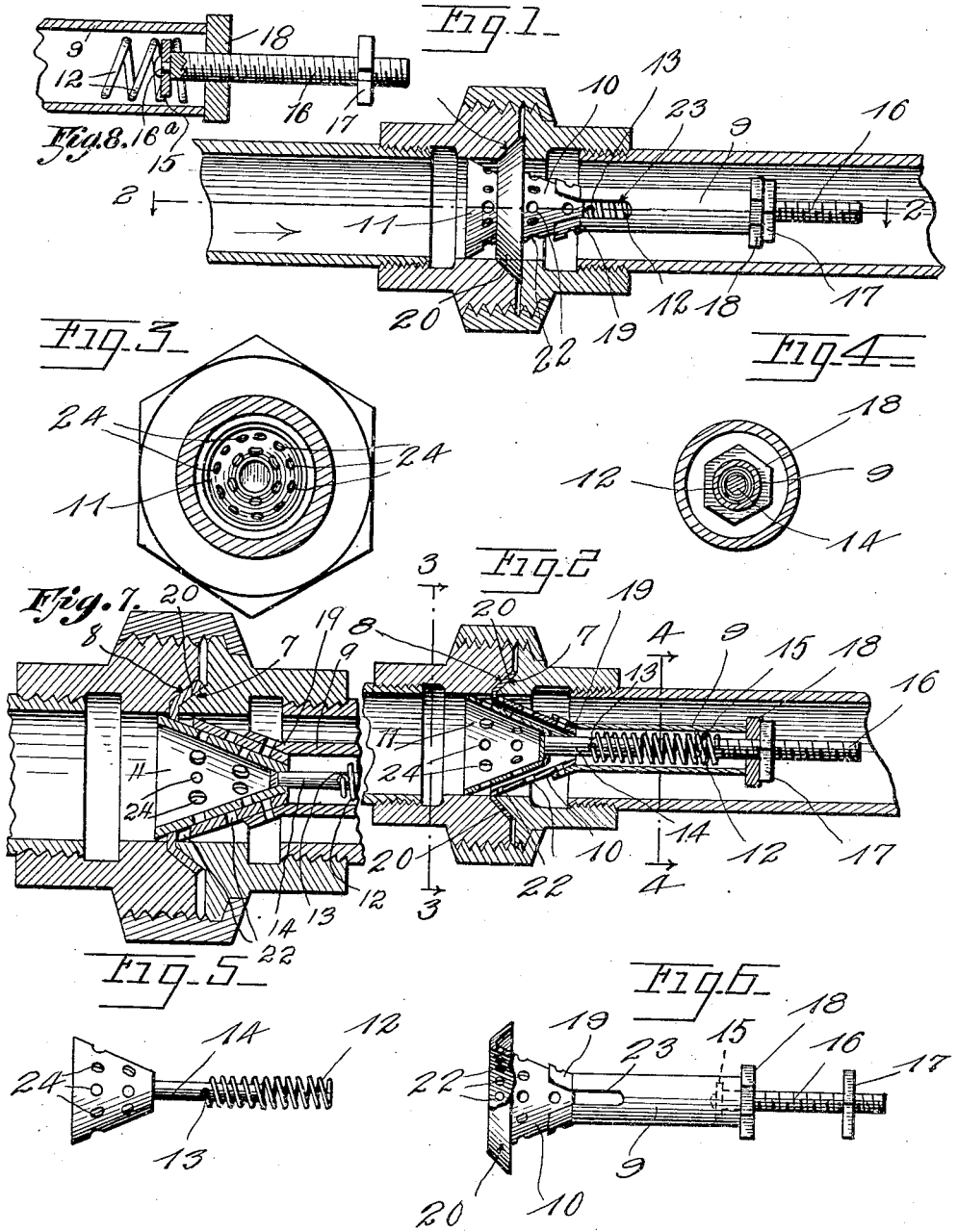
G. A. SHADDUCK.
PRESSURE CLOSED VALVE.
APPLICATION FILED JUNE 9, 1919.
1,364,001.
Patented Dec. 28, 1920.

GUY A. SHADDUCK, OF ROSEBURG, OREGON.

PRESSURE-CLOSED VALVE.

1,364,001. Specification of Letters Patent. Patented Dec. 28, 1920.

Application filed June 9, 1919. Serial No. 302,765.

*To all whom it may concern:*

Be it known that I, GUY A. SHADDUCK, a citizen of the United States, residing at Roseburg, in the county of Douglas and State of Oregon, have invented certain new and useful Improvements in Pressure-Closed Valves; and I do declare the following to be a full, clear, and exact description of the invention, such as will enable others skilled in the art to which it appertains to make and use the same.

This invention relates to valves, and it relates more specifically to an improved pressure-closed valve.

One object of this invention is to provide an improved valve which is closed or partly closed by excessive pressure, and is automatically opened when the pressure is sufficiently relieved or reduced, so that the pressure of fluid that is passed through the valve is kept substantially constant, and therefore when the pressure of the advancing fluid becomes sufficiently great, in consequence of the bursting or disjoining of a steam-pipe, the valve is thereby closed and prevents escape of the steam or other fluid.

Another object is to provide a valve structure that is attachable to a pipe by being clamped between the joint-surfaces of an ordinary pipe-union, without the necessity of in any way changing the construction of the union.

Another object is to provide an improved device of this character which constitutes a unitary structure that is attachable to the pipe-union without removing or displacing any of the elements of the valve.

Another object is to provide an improved valve of this character whose main parts may be stamped, pressed or spun from blanks of sheet metal or from lengths of tubing.

Other objects and advantages may become apparent to persons who read the following details of description in connection with the accompanying drawings, in which:—

Figure 1 is a view illustrating an ordinary pipe coupling having my improved valve seated therein, the valve being in side elevation.

Fig. 2 is a view similar to Fig. 1 except that certain elements of the valve are shown in section.

Fig. 3 is a transverse sectional view, the section being taken along the line 3—3 of Fig. 2.

Fig. 4 is a transverse sectional view, the section being taken along the line 4—4 of Fig. 2.

Fig. 5 is a side elevation of the valve-closing member and its actuating spring.

Fig. 6 is a side elevation of the valve seat and certain of its adjuncts.

Fig. 7 is a detail sectional view showing the valve-closing member seated.

Fig. 8 is a detail sectional view showing the swivel and spring connection.

Referring to these drawings in detail, in which similar reference characters correspond with similar parts throughout the several views, and in which the pipe-union is of ordinary construction, comprising two frusto-conical joint-surfaces 7 and 8; the invention consists of the structure shown separately in Figs. 5 and 6, and in combination with the pipe-union in connection with which it is shown in Figs. 1, 2 and 3. Considered broadly, the valve comprises a tubular member 9 having a flared or frusto-conical end portion 10, the latter constituting the valve seat, and a valve-closing member 11 which is of a size and shape to fit into the valve seat 10 and is normally held out of the valve seat 10 by yielding means which is overcome by an excessive pressure of fluid so as to seat the member 11 in the valve seat and thereby close the valve. The above mentioned yielding means preferably consists of a helical spring 12 which has one end secured at 13 to a valve stem 14 which extends from the smaller end of the valve-closing member 11. The other end of the spring 12 is preferably secured to an adjustable element 15 which is pivotally connected at 16ª to the end of an adjusting screw 16, the latter being provided with a lock-nut 17, it being understood that a suitable screw threaded cap or plug 18 meshes with the threads of the screw 16 and is secured on the remote end of the tubular member 9 from the flared end 10. It will be seen, therefore, that by turning the screw 16, the spring 12 is moved toward or from the cap 18, thereby moving the valve-closing member toward or from the valve seat 10. In the drawings, the tubular member 9 is shown as being formed in two primarily separate parts which are united at 19 by any appropriate means, but in practice, the tubular element 9 may be formed of a single blank of sheet metal or a single length of tubing by any well known means for shaping sheet metal, blanks or sections of tubing.

A very important feature of this invention consists in the formation of an annular flange 20 which is frusto-conical in the present embodiment so as to conform to the joint of the pipe-union illustrated in connection therewith. However, where the joint of the pipe-union is different from the one disclosed, the flange 20 is shaped accordingly. The flange 20 is preferably, though not essentially, formed integrally with the frusto-conical valve seat 10, and in this embodiment, the smaller or convergent end of the flange 20 is united with the larger or divergent end of the valve seat and surrounds the latter.

The valve seat 10 is formed with a plurality of annular series of apertures 22 which extend substantially radially from the exterior to the interior thereof, and slots 23 may also be provided in the member 9, these slots and apertures being in open communication with similar series of apertures 24 in the member 11 when the valve is open, but being out of registry with the apertures 24 when the valve is closed. The larger or divergent end of the valve-closing member 11 is slidably seated against the inner surface of the pipe-union, and is guided thereby into and out of the valve seat 10. Therefore, but little, if any, pressure fluid passes around the member 11, but must pass through the apertures 24, 22 and 23 in going through the valve.

Assuming that fluid is normally passing through the pipe-union from left to right in Fig. 2, it will be seen that a pressure is exerted by the fluid against the valve-closing member 11, and that such pressure is counteracted by the spring 12. However, as the pressure increases, the spring yields accordingly, and the valve-closing member 11 approaches its closed position, thereby lessening the amount of fluid passing through the valve. When the fluid pressure becomes sufficient, the member 11 is seated in the valve seat 10, and this prevents the fluid from passing through the union until the pressure is relieved. Therefore, assuming that a break or leak occurs in the pipe at a point to the right of the union, the counter-pressure on this side of the union is annulled, and the fluid pressure on the valve member 24 becomes so great as to overcome the counterpressure of the spring 12, and the valve is closed and prevents steam or other fluid from escaping.

From the foregoing it will be seen that this device is not only useful as a safety device but is also useful to regulate the amount of fluid passing therethrough, and the consequent pressure of fluid to the right of the valve.

It is not intended to limit this invention to the exact details of construction as shown and described specifically, but changes may be made within the scope of the inventive idea, as described and claimed herein.

What I claim as my invention is:—

1. A valve comprising a tubular member having a flared end provided with a peripheral flange adapted to be clamped in the joint of a pipe-union, a valve-closing member, a stem fixed to and extending from said valve-closing member into said tubular member, a spring in said tubular member and being connected to said stem, an adjustable element to which said spring is secured, and an adjusting screw pivotally connected to said adjusting element and having screw-threaded connection with said tubular member, whereby said screw can be turned while said spring and valve-closing member remains unturned.

2. A valve comprising two hollow conical members adapted to fit one within the other, each of said members having apertures extending radially therethrough, said apertures being out of communication with each other when one of said members is fitted within the other but being at other times in mutual open communication and co-acting with one another to form a fluid passage through these members, and means to move one of said members relative to the other of said members along their axis and thereby establish communication between their radial apertures.

3. A valve comprising a hollow conical valve-seat provided with means to secure it in position within a pipe, a conical valve-closing member provided with an opening therethrough and being seatable in said valve seat for closing the valve, the periphery of this valve-closing member being of a size and shape to fit around and slide along the inner surface of the pipe and be guided thereby to and from its closing position, a stem fixed to and extending from said conical valve-closing member through said valve seat, a spring secured to said stem, and means on said valve-seat and insertible therewith into said pipe and operable to tension said spring, said means also co-acting with said spring to normally hold the valve open.

In testimony whereof I have hereunto set my hand.

GUY A. SHADDUCK.